US011956612B2

(12) United States Patent
Risbo et al.

(10) Patent No.: US 11,956,612 B2
(45) Date of Patent: Apr. 9, 2024

(54) LOUDSPEAKER MOTOR WITH IMPROVED LINEARITY

(71) Applicant: PURIFI APS, Højbjerg (DK)

(72) Inventors: Lars Risbo, Hvalsø (DK); Carsten Tinggaard, Viby Sjælland (DK); Morten Halvorsen, Rødovre (DK); Bruno Putzeys, Achel (BE)

(73) Assignee: PURIFI APS, Højbjerg (DK)

( * ) Notice: Subject to any disclaimer, the term of this patent is extended or adjusted under 35 U.S.C. 154(b) by 232 days.

(21) Appl. No.: 17/434,086

(22) PCT Filed: Feb. 12, 2020

(86) PCT No.: PCT/EP2020/053523
§ 371 (c)(1),
(2) Date: Aug. 26, 2021

(87) PCT Pub. No.: WO2020/173699
PCT Pub. Date: Sep. 3, 2020

(65) Prior Publication Data

US 2022/0141592 A1 May 5, 2022

(30) Foreign Application Priority Data

Feb. 28, 2019 (EP) .................................... 19159991

(51) Int. Cl.
*H04R 9/02* (2006.01)
*H04R 7/12* (2006.01)

(52) U.S. Cl.
CPC ............... *H04R 9/025* (2013.01); *H04R 7/12* (2013.01); *H04R 2209/024* (2013.01)

(58) Field of Classification Search
CPC .... H04R 9/025; H04R 7/12; H04R 2209/024; H04R 9/02; H04R 2209/022; H04R 9/027; H04R 9/06
See application file for complete search history.

(56) References Cited

U.S. PATENT DOCUMENTS 3,867,587 A * 2/1975 Yamamuro ............ H04R 9/025
381/414
3,881,074 A * 4/1975 Kawamura ............ H04R 9/025
335/231

(Continued)

FOREIGN PATENT DOCUMENTS

CN 1389082 A 1/2003
CN 1551680 A 12/2004

(Continued)

OTHER PUBLICATIONS

International Search Report and Written Opinion of International Searching Authority for Application No. PCT/EP2020/053523, dated May 6, 2020 (9 pages).

(Continued)

*Primary Examiner* — Angelica M McKinney
(74) *Attorney, Agent, or Firm* — Ice Miller LLP; Justin D. Swindells

(57) ABSTRACT

The present invention relates to a motor for an electrodynamic loudspeaker, comprising a magnetic circuit assembly arranged about a motor axis. The magnetic circuit assembly comprises: an outer magnet, a magnetically permeable top plate, a magnetically permeable bottom plate, a center pole piece and an air gap for receipt of a voice coil. The air gap is formed by an inner axially extending wall of the magnetically permeable top plate facing an axially extending peripheral wall section of the center pole piece to define a width, a bottom, a top and height of the air gap. The magnetic circuit assembly additionally comprises outwardly projecting magnetically permeable member arranged above the top of the air gap. The center pole piece comprises a magnetic member extending axially from at least the bottom of the air gap to a magnetically permeable bottom member or to the magnetically permeable bottom plate. The magnetic member exhibits a relative AC magnetic permeability (Continued)

smaller than 10, such as smaller than 5 or smaller than 2, such as about 1 which corresponds to the relative AC magnetic permeability of free air.

15 Claims, 13 Drawing Sheets

(56) References Cited

U.S. PATENT DOCUMENTS

| | | | | |
|---|---|---|---|---|
| 3,922,501 | A * | 11/1975 | Yamamuro | H04R 9/025 381/414 |
| 5,402,503 | A * | 3/1995 | Prokisch | H04R 9/025 381/412 |
| 5,461,677 | A * | 10/1995 | Raj | H04R 9/027 381/396 |
| 6,774,510 | B1 | 8/2004 | Moro | |
| 7,869,617 | B2 * | 1/2011 | Jang | H04R 1/2842 381/396 |
| 7,961,892 | B2 * | 6/2011 | Fedigan | H04R 9/063 381/59 |
| 8,855,356 | B1 * | 10/2014 | Price | H04R 9/02 381/420 |
| 11,553,279 | B1 * | 1/2023 | Futtrup | H04R 9/025 |
| 2003/0031338 | A1 | 2/2003 | Suzuki et al. | |
| 2004/0086145 | A1 * | 5/2004 | Stiles | H04R 9/025 381/412 |
| 2004/0105568 | A1 | 6/2004 | Lee | |
| 2004/0131223 | A1 | 7/2004 | Stiles | |
| 2004/0156527 | A1 | 8/2004 | Stiles | |
| 2004/0212254 | A1 | 10/2004 | Stiles | |
| 2005/0190945 | A1 | 9/2005 | Calderwood | |
| 2007/0147652 | A1 | 6/2007 | Takayama et al. | |
| 2010/0278370 | A1 | 11/2010 | Chang | |
| 2012/0051581 | A1 | 3/2012 | Danovi | |
| 2014/0169615 | A1 | 6/2014 | Kristiansen | |
| 2017/0265006 | A1 | 9/2017 | Cardas | |
| 2022/0232325 | A1 * | 7/2022 | Shen | H04R 9/045 |

FOREIGN PATENT DOCUMENTS

| | | | |
|---|---|---|---|
| CN | 1553743 | A | 12/2004 |
| CN | 1992998 | A | 7/2007 |
| CN | 102387451 | A | 3/2012 |
| EP | 1128359 | A1 | 8/2001 |
| EP | 1227701 | A1 | 7/2002 |
| JP | S58-63298 | A | 4/1983 |
| JP | S61-255199 | A | 11/1986 |
| JP | 2008-211675 | A | 9/2008 |

OTHER PUBLICATIONS

Millon High End Luidsprekers; "ALMA Paper Presentation: Woofer Design using non-linear BL(X) curves"; retrieved from https://www.millon.nl/cone-shape-2/ on Aug. 2, 2019 (22 pages).

Risbo, L. et al.; "Force Factor Modulation in Electro Dynamic Loudspeakers"; Audio Engineering Society (AES) 141st Convention Paper, Los Angeles, California; Sep. 29-Oct. 2, 2016 (10 pages).

* cited by examiner

LOUDSPEAKER MOTOR WITH IMPROVED LINEARITY

CROSS-REFERENCE TO RELATED APPLICATIONS

This application is a U.S. National Stage of International Application No. PCT/EP2020/053523, filed Feb. 12, 2020, which claims the benefit of European Patent Application No. 19159991.9, filed Feb. 28, 2019, both of which are incorporated herein by reference in their entireties.

The present invention relates in one aspect to a motor for an electrodynamic loudspeaker and in another aspect to an electrodynamic loudspeaker comprising the motor. The present invention relates in a first aspect to a motor for an electrodynamic loudspeaker, comprising a magnetic circuit assembly arranged about a motor axis. The magnetic circuit assembly comprises: an outer magnet, a magnetically permeable top plate, a magnetically permeable bottom plate, a center pole piece and an air gap for receipt of a voice coil. The magnetic circuit assembly additionally comprises an outwardly projecting magnetically permeable member arranged above the top of the air gap. The center pole piece comprises a magnetic member extending axially from at least the bottom of the air gap to a magnetically permeable bottom member or to the magnetically permeable bottom plate. The magnetic member exhibits a relative AC magnetic permeability smaller than 10, such as smaller than 5 or smaller than 2, such as about 1 which corresponds to the relative AC magnetic permeability of free air.

BACKGROUND OF THE INVENTION

An electrodynamic loudspeaker has a motor that converts electrical energy into mechanical motion. The most common operating principle is a moving-coil, wherein an electrical input or drive current flows in a voice coil of the electrodynamic loudspeaker. The voice coil is suspended in a permanent magnetic field with a strong radial component. The drive current through the voice coil and the radial magnetic field produce a so-called Lorentz force along an axis of the voice coil. The voice coil is typically rigidly attached to a diaphragm or membrane of the electrodynamic loudspeaker. The Lorentz force thereby displaces the diaphragm in an outwardly and inwardly based motion to create sound pressure.

The Lorentz force or drive force on the diaphragm is the product of the drive current I, flux density B in the air gap and a length of the wire I that is inside the radial magnetic field. More accurately, it is I times the integral of the radial component of B over the length of the wire of the voice coil.

This integral is often designated as the BI product or force factor of the motor. The motor accordingly transduces (converts) energy in both directions between electrical and mechanical domains. Consequently, the motor also acts as a dynamo so that mechanical motion produces electrical energy. The magnetic field induces a voltage (EMF) in the voice coil being proportional to a velocity of the voice coil and the diaphragm assembly. The proportionality factor is again the force factor. Practical motors of electrodynamic loudspeakers possess several pronounced non-linear mechanisms which produces undesired linear and non-linear distortions in the generated sound pressure.

One non-linear distortion mechanism is caused by a position/displacement-dependent variation of the BI-product such that the B*I product varies with the position of the voice coil in the magnetic gap. The force factor falls off gradually from a maximum that is typically found at the rest position of the voice coil at zero drive current in the voice coil. This first non-linearity distortion mechanism is static, i.e. only depends on the position of the voice coil.

Another dynamic non-linear distortion mechanism also exists. The drive current in the voice coil creates its own magnetic field in response to the flow of current. Part of the generated magnetic field by the voice coil circulates through the magnetic circuit, i.e. the voice coil behaves as a cored inductor with the magnetic circuit acting as the core. The magnetic flux generated by the voice coil current is superimposed on the permanent magnetic flux in the magnetic gap such that the magnetic flux in the magnetic gap varies with coil current in an undesirable manner.

The force on the voice coil and diagram is no longer strictly proportional to the voice coil current, i.e. drive current, since the force factor itself has become dependent on the voice coil current. This effect depends on the position of the voice coil but non-linearity exists because of the superposition of the two magnetic fields, not because of the movability of the voice coil. Depending on how the problem is described, force factor modulation is also known as position-dependent inductance, flux modulation and reluctance force. It is described in detail in AES Paper "Force Factor Modulation in Electro Dynamic Loudspeakers" presented at $141^{st}$ Convection 2016 Sep. 29-Oct. 3.

The force-factor modulation causes a $2^{nd}$ order non-linear distortion in the form of a force component proportional to the voice coil current squared:

$$F = \frac{\partial L}{\partial x} i^2,$$

where L is the position dependent generalized inductance of the coil as defined in the subject AES paper, x is the coil position and i is the coil current.

In other words, the $2^{nd}$ order non-linear distortion is proportional to the voice coil current squared and the spatial derivative of the coil inductance. The variable voice coil inductance also produces distortion in yet another way. The voice coil inductance is part of the electrical impedance of the voice coil such that when it is driven by a voltage source (as it is in the vast majority of cases), the voice coil current becomes dependent on the applied drive voltage in a position dependent manner. It is shown in the above-mentioned 2016 AES paper that the equation for the non-linear component of the force can be generalized to include frequency dependency of the voice coil inductance. As mentioned before, the magnetic circuit acts as a core for the voice coil which means that the voice coil inductance becomes frequency dependent when the permeability of parts of the magnetic circuit is frequency dependent.

The cause of frequency dependent permeability is the introduction of eddy currents which flow in all parts or member of the magnetic circuit or system that are electrically conductive, such as iron parts, when the voice coil magnetic flux changes, either because current changes or because the coil moves. The eddy currents will flow in such a manner as to counteract changes in magnetic flux (Lenz's law)—or stated alternatively, the eddy currents act as shorted coil turns which reduce the inductance of the voice coil.

Because the conductivity of the materials in which those eddy current flows is finite, the current will die down when the coil flux remains static for some time, i.e. there are no eddy currents to counteract the inductance at DC, or 0 Hz, and at very low frequencies. Consequently, the voice coil inductance at DC is solely determined by the geometry and permeability of the materials of the magnetic circuit. At higher frequencies the eddy currents become more pronounced so as to reduce inductance below that found at DC.

Certain prior art electrodynamic loudspeakers have included so-called shorting rings around the pole piece and the voice coil. These rings are made of an electrically conductive, but non-magnetic material, such as copper or aluminum. The aim is to reduce the voice coil inductance, at least at higher frequencies. Thanks to the lower resistivity of copper or aluminum compared to iron, most of the eddy currents flow in the shorting rings instead of in the iron. For the same reason the eddy currents are also larger, and therefore more strongly counteract the magnetic field variation that the voice coil tries to induce or create in the magnetic circuit. This reduces force factor modulation, at least at higher frequencies. Further side benefits include reduced inductance, meaning higher sensitivity for a given voltage applied across the voice coil, and a reduction in the non-linear inductance caused by magnetic hysteresis in the iron. That does not mean that a shorting ring, however placed, will unconditionally improve linearity. Since force factor modulation is equivalent to a position dependency of the generalized voice coil inductance, it is quite possible, at elevated frequencies, to reduce the inductance whilst at the same time driving up the spatial gradient of that inductance (absolute change per millimeter of motion). At low frequencies, the prior art shorting rings have no effect. The lower the frequency at which an effect is desired, the greater the section of the shorting ring has to be at lower frequencies that section becomes too large for the amount of space available inside the magnetic circuit of a practical loudspeaker.

The present inventors have realized that if the motor and magnetic circuit of an electrodynamic loudspeaker is designed, or configured, such that the voice coil inductance is displacement/position-independent, then non-linear distortion due to the force factor modulation and non-linear distortion due to voice coil current modulation are both eliminated. Therefore, an ideal motor for an electrodynamic loudspeaker exhibits a voice coil inductance that does not change with displacement of the voice coil, i.e. it is position independent.

Consequently, one aim or objective of the present invention is to provide an electrodynamic loudspeaker motor which substantially eliminates the harmful displacement dependency of the voice coil inductance or at least markedly reduces displacement/position dependency of the voice coil inductance compared to prior art loudspeaker motors. This reduction will improve linearity of the motor and thereby reduce several types of non-linear distortion of the electrodynamic loudspeaker for the reasons described above. Thus, improving the objective and subjective sound quality of the loudspeaker.

SUMMARY OF THE INVENTION

A first aspect of the invention relates to a motor for an electrodynamic loudspeaker, comprising: a magnetic circuit assembly arranged about a motor axis. The magnetic circuit assembly may comprise: an outer magnet, a magnetically permeable top plate, a magnetically permeable bottom plate, a center pole piece and an air gap for receipt of a voice coil. The air gap is formed by an inner axially extending wall of the magnetically permeable top plate facing an axially extending peripheral wall section of the center pole piece to define a width, a bottom, a top and height of the air gap. The magnetic circuit assembly additionally comprises outwardly projecting magnetically permeable member arranged above the top of the air gap. The center pole piece comprises a magnetic member extending axially from at least the bottom of the air gap to a magnetically permeable bottom member or to the magnetically permeable bottom plate. The magnetic member exhibits a relative AC magnetic permeability smaller than 10, such as smaller than 5 or smaller than 2, such as about 1 which corresponds to the relative AC magnetic permeability of free air.

In the present specification, the term "AC magnetic permeability" of the magnetic member refers to a slope of a tangent of a curve/plot of flux density, B, versus magnetic field strength, H, at zero voice coil current. The term "relative AC magnetic permeability", $\mu_r$, refers to the "AC magnetic permeability" expressed as a multiple of the magnetic vacuum permeability $\mu_0$. The tangent can be viewed as a linearized small signal, or AC, model around a DC operating point of the magnetic member. The slope of the tangent is the permeability of the small-signal model of the magnetic member, i.e. the "AC magnetic permeability" of the magnetic member. At large magnetic field strengths, for example above 1.5 Tesla, this B-H curve becomes flatter, meaning that the AC magnetic permeability decreases as the material of the magnetic member saturates. A permanent magnet is by nature highly magnetically saturated and therefore typically possesses an AC magnetic permeability that is not much larger than that of air. Neodymium magnets may exhibit a relative AC magnetic permeability below 1.5 or below 1.1.

Hence, the small AC magnetic permeability of the magnetic member in combination with the outwardly projecting magnetically permeable member provides a synergistic effect by markedly reducing the increase of the voice coil inductance at inwards displacements of the voice coil, and additionally compensating a small residual voice coil inductance increase by the arrangement of the outwardly projecting magnetically permeable member above the top of the air gap. This geometry ensures that the voice coil inductance also increases at outwards displacement of the voice coil in nearly the same proportion as the inductance increases at inwards displacement of the voice coil, hence making the displacement dependent variation of inductance of the voice coil extremely small as discussed in additional detail below with reference to the appended drawings.

The magnetic member of the center pole piece may comprise a permanent magnet such as a Neodymium magnet or a Ferrite magnet which by nature are highly magnetically saturated as discussed above. Alternatively, the magnetic member of the center pole piece may comprise magnetically permeable material, such as an isotropic, high resistive Soft Magnetic Composite (SMC) material, driven into DC magnetic saturation by at least one of: a permanent magnet and a field coil.

The outwardly projecting magnetically permeable member may generally be arranged inside, or outside, an outwardly projecting plane or surface defined by the axially extending peripheral wall section of the center pole piece as discussed in additional detail below with reference to the appended drawings—for example in connection with the motor embodiments of FIGS. 2 and 4.

In one embodiment of the motor, the center pole piece comprises a magnetically permeable top member which is extending axially from the bottom of the air gap to the top of the air gap and thereby forms or defines the axially extending peripheral wall section of the center pole piece. The outwardly projecting magnetically permeable member may be arranged on top of the magnetically permeable top member and either integrally formed therewith or provided as a separate element bonded or abutted to a top surface of the magnetically permeable top member as discussed in additional detail below with reference to the appended drawings. The magnetically permeable top member and/or the outwardly projecting magnetically permeable member may formed by or comprise, a highly permeable material, e.g. a ferromagnetic material such as AISI CR1010 steel or an isotropic, high resistive Soft Magnetic Composite (SMC) material discussed in additional detail below with reference to the appended drawings.

According to one embodiment of the motor, the outer magnet comprises an annular permanent magnet co-axially arranged around a cylindrical center pole piece centered about the motor axis.

According to another embodiment of the motor, a height of the outwardly projecting magnetically permeable member exceeds a height of the magnetically permeable top plate for example 1.5 times the height of the magnetically permeable top plate.

According to another embodiment of the motor, a height of the magnetic member of the center pole piece is larger than a difference between a height of the voice coil and the height of the air gap.

Additional embodiments of the invention are set out in the below-appended dependent patent claims.

A second aspect of the invention relates to an electrodynamic loudspeaker comprising:

- a frame,
- a motor according to any of the above-described embodiments of the motor and/or any of the below-described embodiments of the motor in connection with the appended drawings. The electrodynamic loudspeaker additionally comprises a displaceable diaphragm or membrane attached to the voice coil where said voice coil is arranged in the air gap of the motor, for example freely suspended in the air gap.

The magnetic circuit assembly of the electrodynamic loudspeaker is preferably configured such that a variation of inductance of the voice coil over a predetermined displacement range of the voice coil defined by an outward displacement limit and an inward displacement limit is less than 10%, such as less than 7.5%, or even less than 5%, measured at 31 Hz; wherein said displacement range corresponds to 0.5 times a difference between a height of the voice coil and a height of the air gap. The skilled person will appreciate that the outward and inward displacement limits may be symmetrical about a rest or neutral position of the voice coil. The magnetic circuit assembly of the electrodynamic loudspeaker is preferably configured such that also the variation of inductance of the voice coil over the predetermined displacement range falls within the same percentage limits at one or more additional test frequencies selected from a group of: 1 Hz, 100 Hz, 316 Hz, 1 kHz, and 3.16 kHz.

BRIEF DESCRIPTION OF THE DRAWINGS

Preferred embodiments of the invention are described below in additional detail in connection with the appended drawings, in which.

DETAILED DESCRIPTION OF PREFERRED EMBODIMENTS

Figure 1:
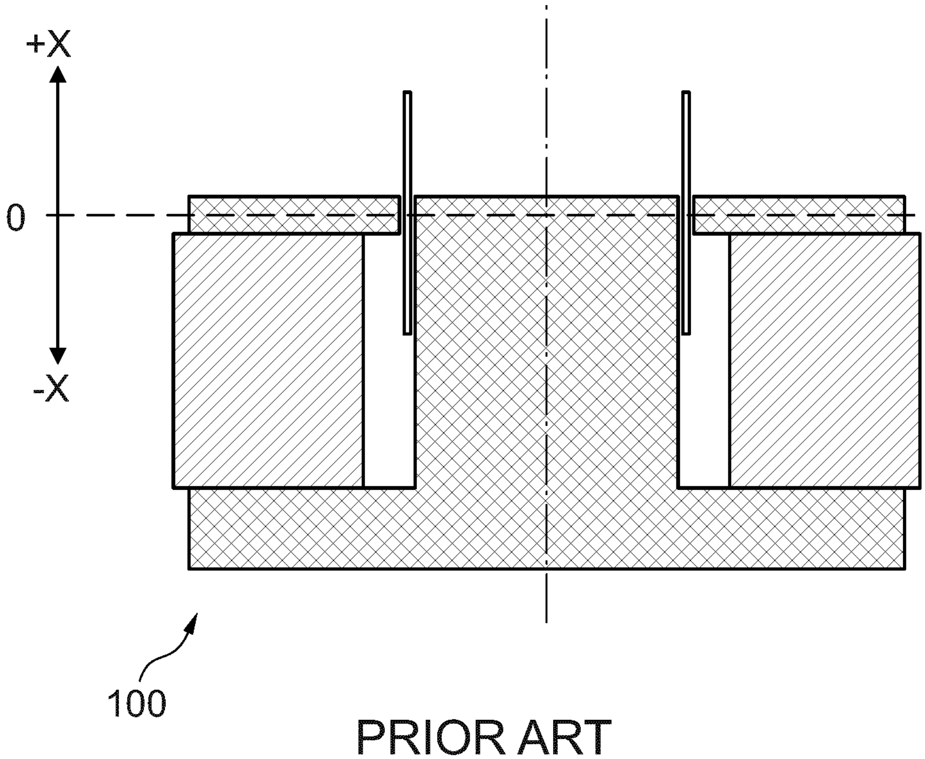
PRIOR ART Fig. 1
FIG. 1 is a schematic cross-sectional view of a prior art motor of an electrodynamic loudspeaker.

In the following, various exemplary embodiments of the present motor for an electrodynamic loudspeaker are described with reference to the appended drawings. The skilled person will understand that the accompanying drawings are schematic and simplified for clarity and therefore merely show details which are essential to the understanding of the invention, while other details have been left out. Similar reference numerals refer to like elements or components throughout the application. Similar elements or components will therefore not necessarily be described in-detail with respect to each figure. It will further be appreciated that certain actions and/or steps may be described or depicted in a particular order of occurrence while those skilled in the art will understand that such specificity with respect to the described sequence is not actually required.

FIG. 1 is a schematic cross-sectional view of a prior art motor 100 of an electrodynamic loudspeaker. The voice coil inductance is proportional to the number of windings of the voice coil squared, and inversely proportional to the magnetic reluctance of the magnetic circuit. The number of windings is fixed, wherein the reluctance of the magnetic circuit may change with displacement of the voice coil, and therefore also displacement of the diaphragm attached to the voice coil position due to varying amount of materials with higher permeability than air that are close to the voice coil. Another way to describe it: the effective permeability is modulated by the displacement of the voice coil. The voice coil surrounds a central iron pole piece. When the voice coil is inwardly displaced towards the bottom plate, i.e. negative X position (−X) from the rest position 0 as indicated on the drawing, the voice coil inductance is high due to the increased amount of iron material inside the voice coil. This position of the voice coil increases the effective permeability. Conversely, the voice coil inductance is low when the latter is displaced outwardly in the direction of the diaphragm of the motor, i.e. positive X (+X) position from the rest position 0 as indicated on the drawing, since the voice coil moves out in the free air which exhibits a low magnetic permeability.

Figure 2A:
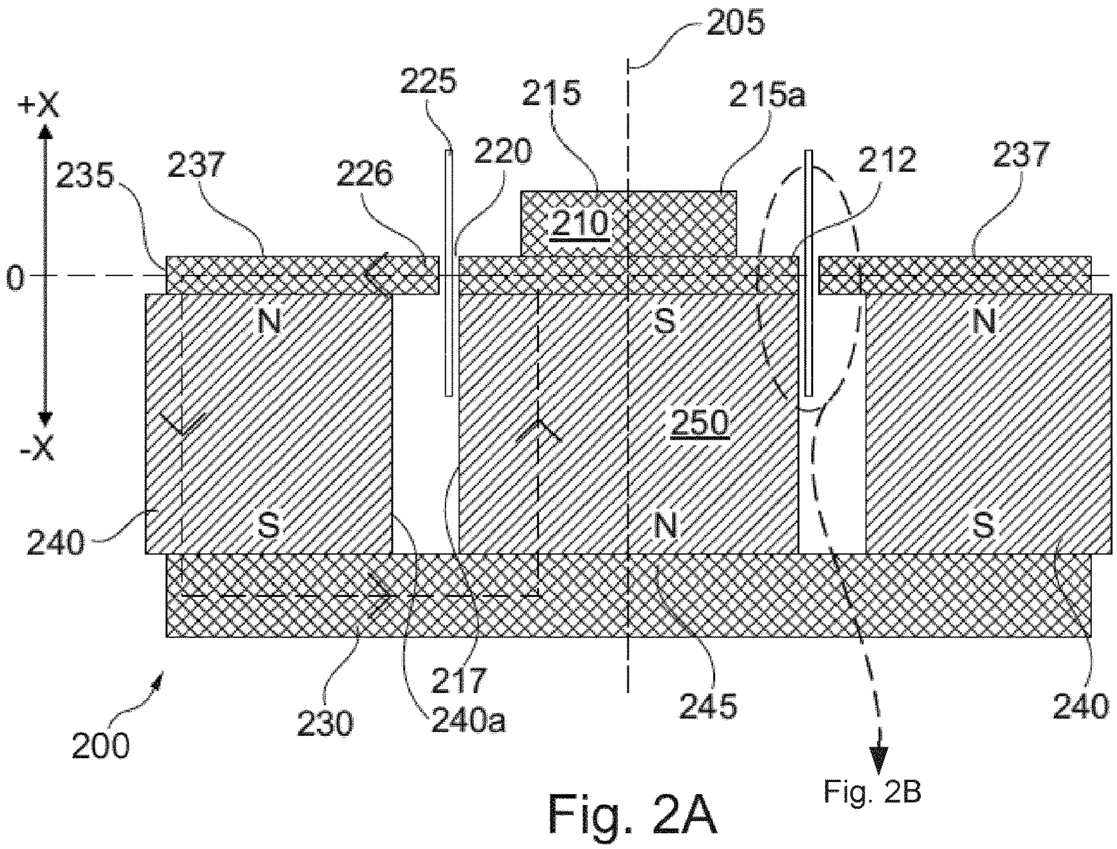
FIG. 2 is schematic axial cross-sectional view of a motor for an electrodynamic loudspeaker in accordance with a first embodiment of the invention.

FIG. 2A shows a schematic axial cross-sectional view of a motor 200 for an electrodynamic loudspeaker (not shown) in accordance with a first embodiment of the invention. The size of the electrodynamic loudspeaker may be so-called 6.5 inch dimension with a diaphragm diameter of about 120 mm. The present motor 200 and its magnetic circuit assembly, as well as the other motor embodiments discussed below, are configured or designed such that the displacement-dependent variation of inductance of the voice coil is minimized or reduced compared to prior art loudspeaker motors. Consequently, non-linear distortion due to force factor modulation and non-linear distortion due to voice coil current modulation are both minimized for the reasons discussed in detail above in the background of the invention section.

The motor 200 may be rotationally symmetrical about a central motor axis 205 of the motor 200. The motor 200 comprises a magnetic circuit assembly which is configured to generate a radially oriented essentially static magnetic field in a ring-shaped air gap 220. The magnetic circuit assembly comprises an outer annular permanent magnet 240, a magnetically permeable top plate 235, e.g. formed as an annular disc, a magnetically permeable bottom plate or yoke 230 and a center pole piece 245. The air gap 220 is configured for receipt of a ring-shaped or annular voice coil 225, which may form part of a diaphragm assembly of the electrodynamic loudspeaker. The annular or ring-shaped voice coil 225 is suspended freely in the ring-shaped air gap 220 and therefore displaceable along the central motor axis 205 outwardly away from the magnetic circuit assembly and inwardly into the magnetic circuit assembly about a rest position 0 of the voice coil. The rest position corresponds to DC zero current in the ring-shaped voice coil 225, and preferably corresponds to a centered position of the ring-shaped voice coil 225 in the air gap 220. The rest position of the ring-shaped voice coil 225 is schematically indicated by "0" on the "X" arrow of the drawing, while the outward displacement of the voice coil 225 away from the magnetic circuit assembly corresponds to positive/+ direction of X, and inward displacement of the voice coil 225 into the magnetic circuit assembly corresponds to negative/− direction of X.

The magnetically permeable top plate 235 may be formed from a highly permeable material, e.g. a ferromagnetic material such as CR1010 steel and a have height between one-sixth and two-thirds of the height of the ring shaped voice coil 225. The magnetically permeable bottom plate or yoke 230 may be formed from a highly permeable material, e.g. a ferromagnetic material such as AISI CR1010 steel, and a have height or thickness between 4 mm and 16 mm depending on the outer dimensions of the motor 200.

The center pole piece or center pole assembly comprises a magnetic member 250 which extends from a bottom 220*b* of the air gap 220 to a magnetically permeable bottom member which may be formed as an upwardly projecting cylindrical protrusion integrally formed with the magnetically permeable bottom plate or yoke 230. The magnetically permeable bottom member is physically and magnetically coupled to the lower surface of the magnetic member 250. Hence, the magnetic member 250 in the present embodiment of the motor 200 is arranged in-between a magnetically permeable pole top 210, which may be a flat disc, and the magnetically permeable bottom member. In other embodiments of the magnetic circuit assembly, the magnetic member 250 may extend axially all the way from the bottom 220*b* of the air gap 220 to the magnetically permeable bottom plate or yoke 230. The height of the magnetic member 250 is preferably at least 0.5 times the height of the annular permanent magnet 240, for example more than 0.7 times, or 0.9 times the height of the annular permanent magnet 240. Alternatively, or additionally, the height of the magnetic member 250 is larger than a difference between a height of the voice coil and the height of the air gap 220. Each of these limitations will typically ensure that the height of the magnetic member 250 is sufficiently large to markedly reduce the inductance of the voice coil at inward displacements because of the reduction of the amount of magnetically permeable material inside the voice coil.

Figure 2B:
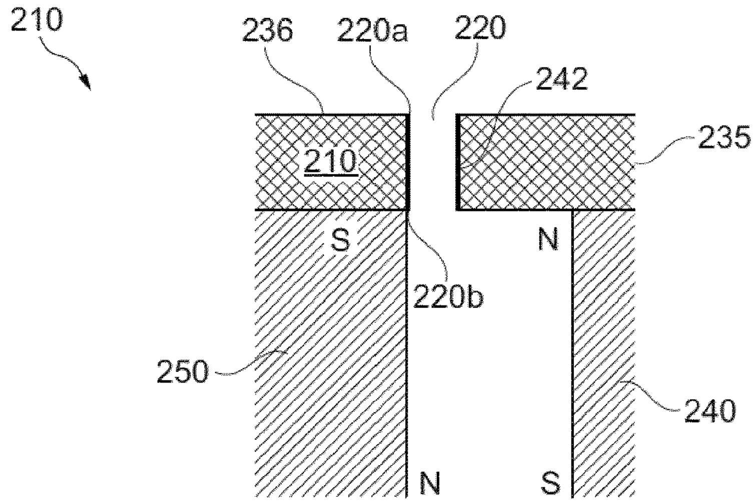

The magnetically permeable pole top 210 is extending axially from a bottom 220*b* of the air gap 220 (refer to FIG. 2B)) to a top 220*a* of the air gap 220 to define an axially extending peripheral wall section 236 of the center pole piece 245 which forms an inner, e.g. circular or elliptical, wall or surface of the air gap 220. The opposing wall of the air gap 220 is formed by an inner, e.g. circular or elliptical, axially extending wall 242 of the magnetically permeable top plate 235, wherein the axially extending wall 242 is facing the axially extending peripheral wall section of the center pole piece 245 so as to define a width, a bottom 220*b*, a top 220*a* and height of the air gap 220. The skilled person will appreciate that the height and/or width of the air gap 220 may be scaled according to the overall dimensions of the motor 200 and voice coil 225. The magnetically permeable pole top 210 may formed from a highly permeable material e.g. a ferromagnetic material such as AISI CR1010 steel.

The magnetically permeable pole top 210 comprises an outwardly projecting portion or protrusion 215 or "hat" 215 arranged above, i.e. outwardly of, the top 220*a* of the air gap 220. Hence, in the present embodiment, the outwardly projecting portion or protrusion 215 is also arranged above an upper flat surface 237 of the magnetically permeable top plate 235. The outwardly projecting "hat" 215 is arranged inside, i.e. towards the central motor axis 205, an outwardly projecting plane or surface (not shown) defined by the axially extending peripheral wall section 217 of the center pole piece 245. Hence, allowing unrestricted axial displacement of the voice coil 225.

The magnetically permeable pole top 210 may therefore comprise a first cylindrical portion or section 212 that defines the above-discussed inner wall (axially extending peripheral wall section) 236 of the air gap 220. The magnetically permeable pole top 210 of the center pole piece 245 additionally comprises the above-mentioned outwardly projecting protrusion 215, which in the present embodiment is formed by a second cylindrical portion of the magnetically permeable pole top 210, arranged on top of the first cylindrical portion 212 and either integrally formed therewith or provided as a separate element bonded or abutted to a top surface of the first cylindrical portion 212. The skilled person will appreciate that the outwardly projecting protrusion 215 need not be cylindrical. The first and second cylindrical portions 212, 215, respectively, of the magnetically permeable pole top 210 may be integrally formed—for example by milling or machining a suitably shaped cylindrical Ferrite member or other highly magnetically permeable material such as AISI CR1010 steel or an isotropic, high resistive Soft Magnetic Composite (SMC) material like Somaloy® material such as Somaloy 1P, Somaloy 3P or Somaloy 5P manufactured and sold by Höganas AB. A cross-sectional area of the second cylindrical portion 215 may be smaller than a cross-sectional area of the first cylindrical portion or section 212 to define a recessed upper outer circular wall 215*a* relative to the inner wall 236 of the magnetically permeable pole top 210, which defines the inner surface or inner wall 236 of the magnetic gap 220. In other words, the outwardly projecting protrusion 215 extends outwards above the magnetic gap 220 in the axial direction 205 of the motor 200.

In certain alternative embodiments, the first and the second cylindrical portions 212, 215, respectively, may have identical diameters to eliminate the recessed properties of the upper outer circular wall 215*a*.

The magnetic member 250 may exhibit a relative AC magnetic permeability smaller than 10, such as smaller than 5, or smaller than 2. In certain embodiments, the magnetic member 250 comprises, or is formed by, a permanent magnet such as a Neodymium magnet or a Ferrite magnet. In other embodiments of the motor 200 as discussed in additional detail below, the magnetic member 250 comprises a magnetically permeable material, for example an isotropic, high resistive Soft Magnetic Composite (SMC) material, which material is driven into DC magnetic saturation by at least one of: a permanent magnet and a field coil. The SMC material may comprise the above-discussed Somaloy® material.

Each of the outer annular permanent magnets 240 and the magnetic member 250 are axially magnetized as schematically illustrated by the magnetic field lines, which are used to drive magnetic flux through the magnetic circuit assembly and across the air gap which therefore carries a radially oriented magnetic field. The outer annular permanent magnets 240 may comprise a Ferrite magnet or Neodymium magnet.

The arrangement of the magnetically permeable outwardly projecting protrusion or hat 215 increases the inductance of the voice coil 225 at outwards displacement, i.e. positive "X" values, of the voice coil 225, such that the increase of inductance is effectively counteracting, or compensating for, the increased inductance of the voice coil 225 at inwards displacements thereof.

The reduced cross-sectional area of the magnetically permeable hat 215 directs the DC magnetic flux, i.e. static DC magnetic flux, of the magnetic circuit assembly to flow in the air gap 220. This feature ensures that the DC magnetic flux is focused in the air gap 220 and that the magnetic field strength is low in the magnetically permeable hat 215. This feature in turn ensures that the magnetically permeable hat 215 is kept out of magnetic saturation leading to a high permeability and a more effective compensation of the displacement dependent inductance L(x) of the voice coil 225.

In contrast, the magnetic member 250 which is arranged below the bottom 220*b* of the air gap 220, e.g. having an upper end surface substantially aligned with the bottom 220*b* of the air gap 220, preferably exhibits or possesses a small relative AC magnetic permeability as specified above in order to reduce the displacement dependency of the voice coil inductance. The small AC relative magnetic permeability can be achieved in several ways, for example by means of high DC or static magnetic saturation e.g. by the use of a permanent magnet or using a soft magnetic material such as ferromagnetic material driven into DC saturation by a permanent magnet or field coil as explained below. In both cases the AC relative magnetic permeability may be very small, e.g. below 10 or below 5.

The above-mentioned increase of the voice coil inductance at inwards displacements of the voice coil 225 is caused at one hand by the reduced distance from the voice coil 225 to the magnetically permeable bottom plate or yoke 230 including the upwardly projecting cylindrical projection. Another significant contribution to the increase of voice coil inductance in prior art motor designs at inwards displacements of the voice coil 225 is the high magnetic permeability of ferromagnetic material of the center pole piece.

The skilled person will appreciate that the combined properties of the magnetic member 250 and the magnetically permeable hat 215 largely eliminate, or at least markedly reduce, this undesired increase of the voice coil inductance at inwards displacements of the voice coil 225 of the present motor 200. The small AC relative magnetic permeability of the magnetic member 250, which in some embodiments may be comparable to free air, i.e. $\mu_r$=1.0, at least reduces the presence of magnetically permeable material inside the voice coil 225 at inwards displacements. The voice coil inductance may still be at its maximum when the voice coil 225 is fully drawn inwards, because the magnetically permeable top member 210 and yoke 230 still help to shorten the magnetic field lines compared to free air. Crucially though, that voice coil inductance is markedly reduced compared to the design with the magnetically permeable center pole piece near to the coil.

Hence, the magnetic member 250 and the magnetically permeable hat 215 provide a synergistic effect by firstly markedly reduce the voice coil inductance at inward displacements of the voice coil 225 by the magnetic member 250, and in addition compensate the small residual voice coil inductance increase at inward displacements by the arrangement of the magnetically permeable hat 215 above the top of the air gap 220, such that the voice coil inductance also increases at outwards displacement of the voice coil 225. In other words, to combine the magnetically permeable hat 215 with the magnetic member 250 in the center pole piece 245 which thanks to its low AC magnetic permeability, makes it amenable for precisely this purpose.

Figure 3:
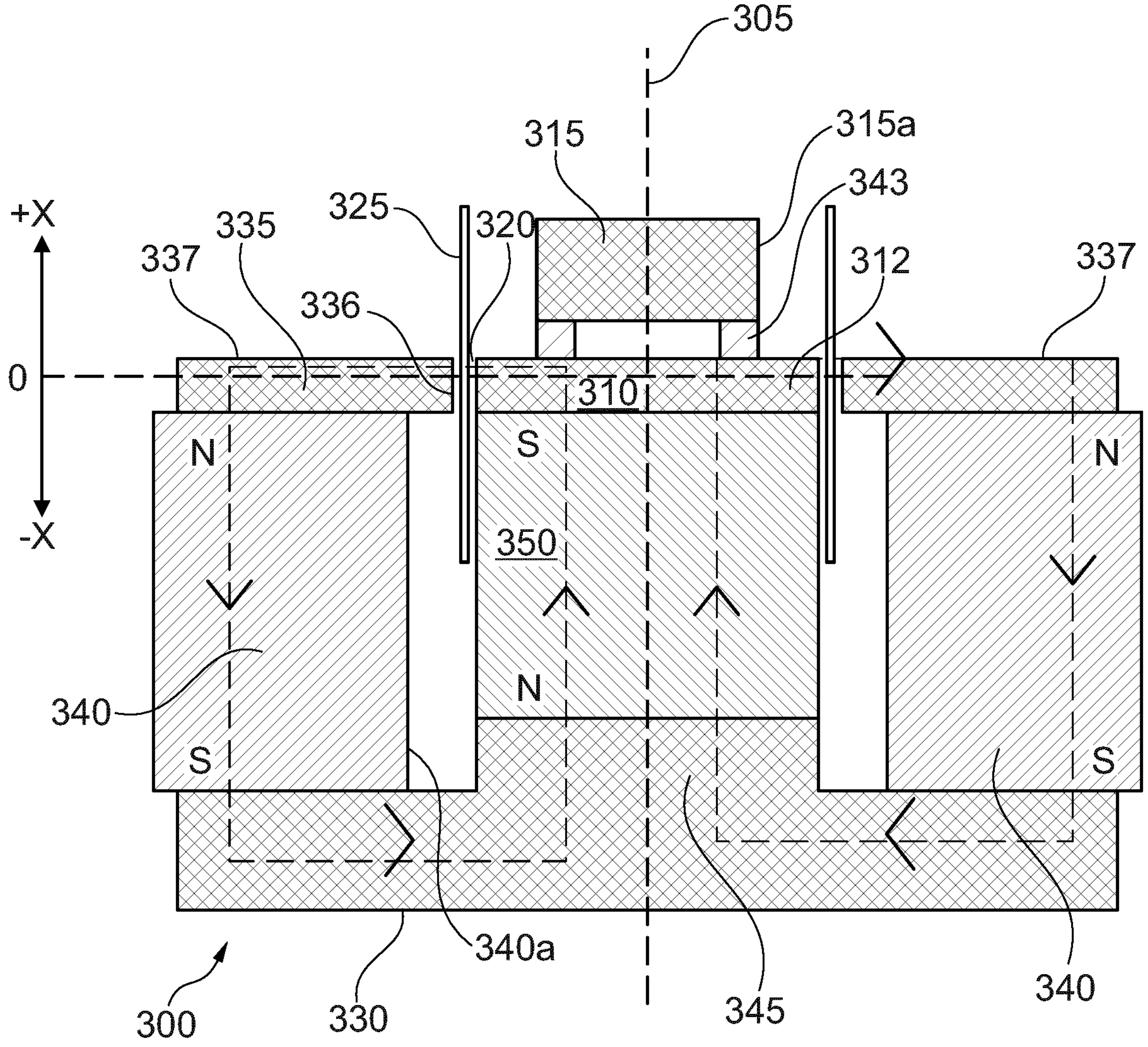
FIG. 3 is schematic axial cross-sectional view of a motor for an electrodynamic loudspeaker in accordance with a second embodiment of the invention.

FIG. 3 shows a schematic axial cross-sectional view of a motor 300 for an electrodynamic loudspeaker (not shown) in accordance with a second embodiment of the invention. An outwardly projecting magnetically permeable member 315 is supported by a non-magnetic spacer 343 disposed in-between a top surface of a magnetically permeable pole top 310 of the center pole piece 345 and magnetically permeable hat 315. Even though the magnetically permeable hat 315 is not directly physically or magnetically coupled to the center pole piece its high magnetic permeability still compensates for the displacement-dependent inductance of the voice coil 325 at outwards displacements or positions for the reasons discussed above.

Figure 4:
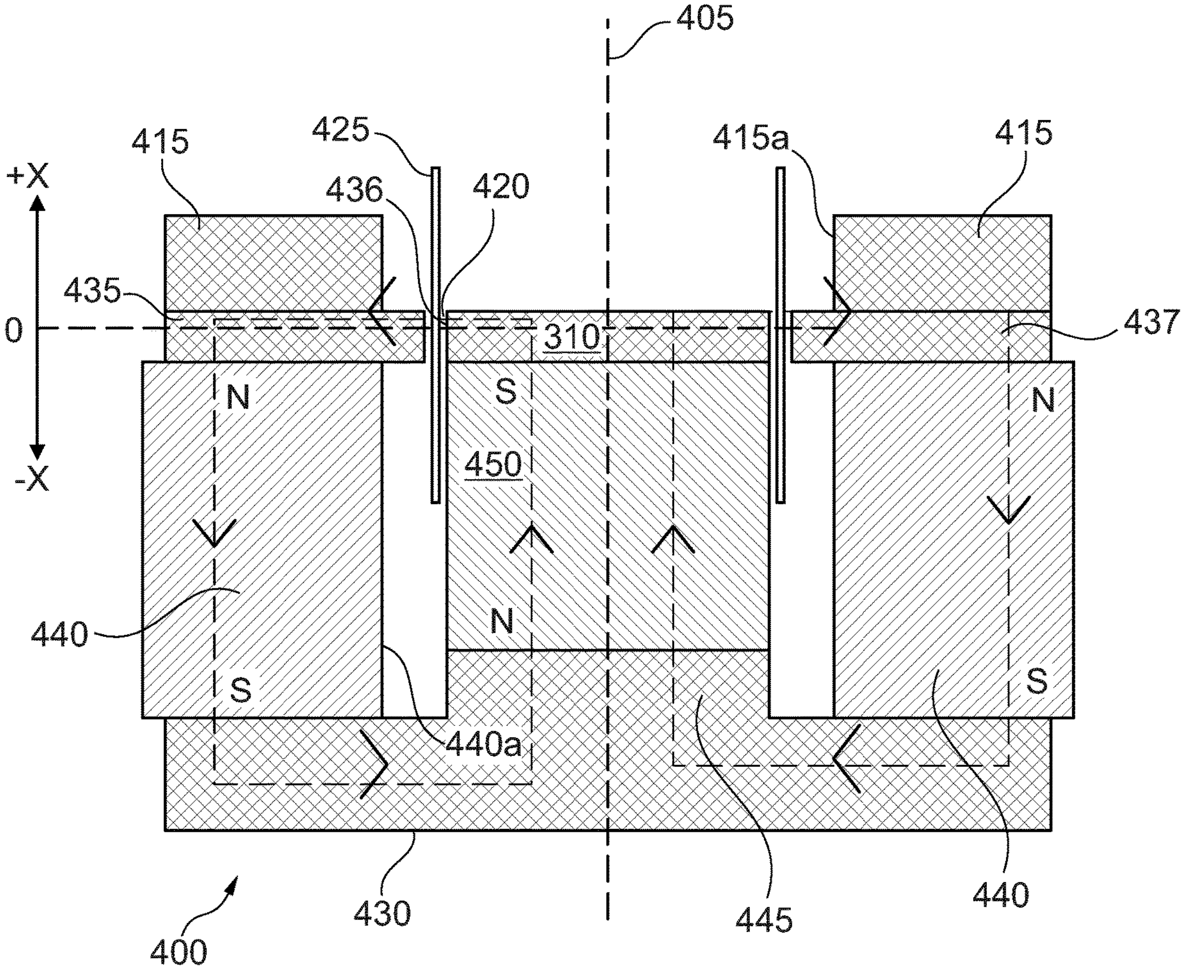
FIG. 4 is schematic axial cross-sectional view of a motor for an electrodynamic loudspeaker in accordance with a third embodiment of the invention.

FIG. 4 shows a schematic axial cross-sectional view of a motor 400 for an electrodynamic loudspeaker (not shown) in accordance with a third embodiment of the invention. A magnetically permeable top plate 435 of the magnetic circuit assembly comprises an annular magnetically permeable disc-like protrusion 415. The annular magnetically permeable disc 415 may be integrally formed with the magnetically permeable top plate 435. An inner circular peripheral wall 415*a* of the annular magnetically permeable disc 415 is arranged outside an outwardly projecting plane defined by the inner axially extending wall 436 of the magnetically permeable pole top 410. Even though the annular magnetically permeable hat 415 is arranged entirely outside of the outwardly projecting plane defined by the inner axially extending wall 436 and therefore outside the voice coil 425, its proximity and high magnetic permeability still compensates the displacement dependent inductance of the voice coil 425 at outwards displacements or positions for the reasons discussed above.

Figure 5:
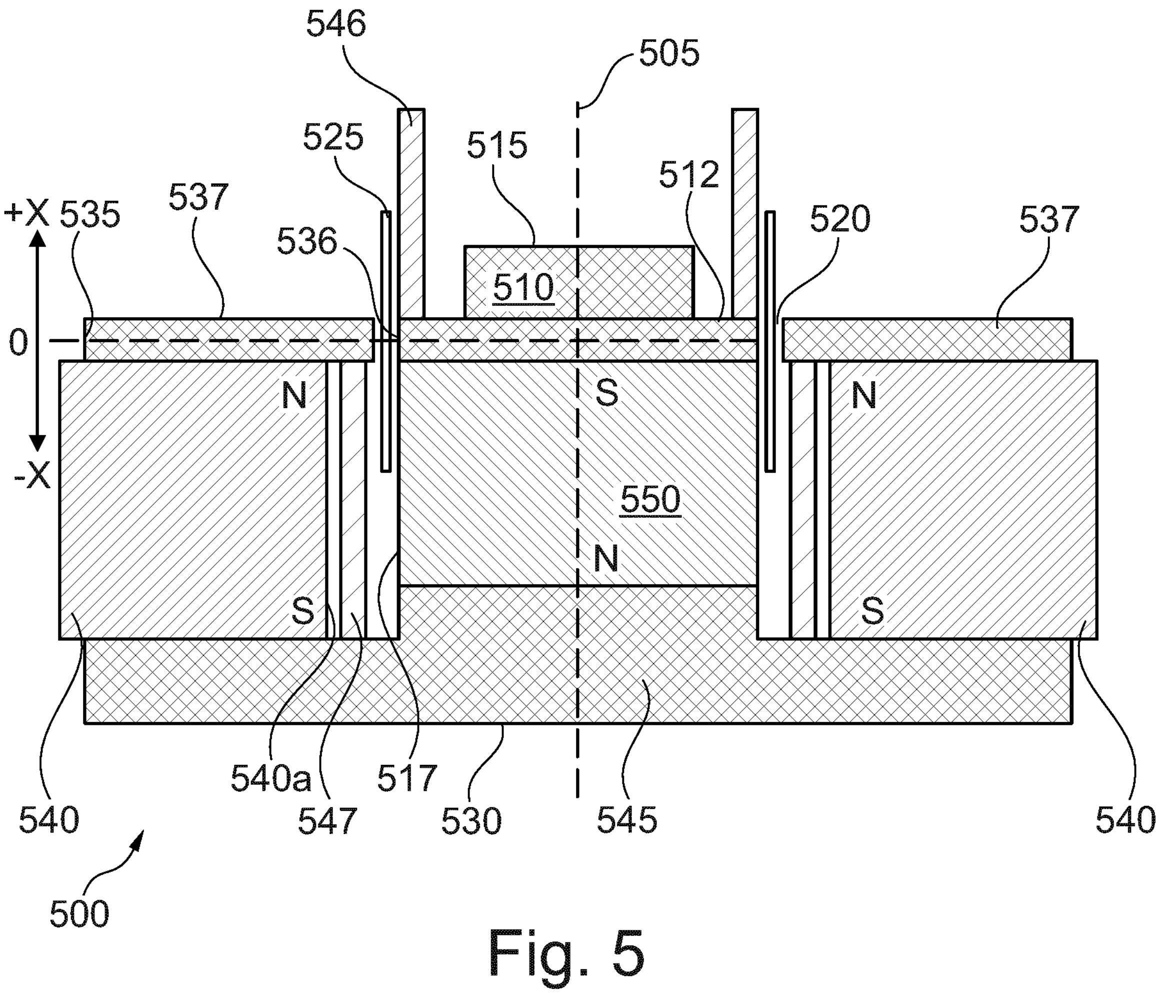
FIG. 5 is schematic axial cross-sectional view of a motor for an electrodynamic loudspeaker in accordance with a $4^{th}$ embodiment of the invention.

FIG. 5 shows a schematic axial cross-sectional view of a motor 500 for an electrodynamic loudspeaker (not shown) in accordance with a 4$^{th}$ embodiment of the invention. The motor 500 is largely identical to the previously discussed motor 200 according to the first embodiment, but additionally comprises a first electrically conductive ring 547 arranged below the bottom of the air gap 520 and surrounding the center pole piece. The center pole comprises a magnetic member 500 and a magnetically permeable pole top 510 and a magnetically permeable bottom member 545. The motor 500 may furthermore comprise a second electrically conductive ring 546 resting on an outwards oriented surface of the magnetically permeable pole top 510 and surrounding the outwardly projecting magnetically permeable hat 515. Hence, the second electrically conductive ring 546 is arranged above a top of the air gap 520 and inside an outwardly projecting plane or surface defined by the axially extending peripheral wall section 517 of the center pole piece. Each of the first and second electrically conductive rings 547, 546 operates as the so-called shorting rings and are preferably made from an electrically conductive, but non-magnetically permeable, material such as copper or aluminum. The benefit of the shorting rings 547, 546 is a reduction in the increase of the voice coil impedance at higher frequencies, e.g. above 10 Hz by reduction of eddy currents flowing in the magnetic circuit assembly for the reasons discussed above.

Figure 6:
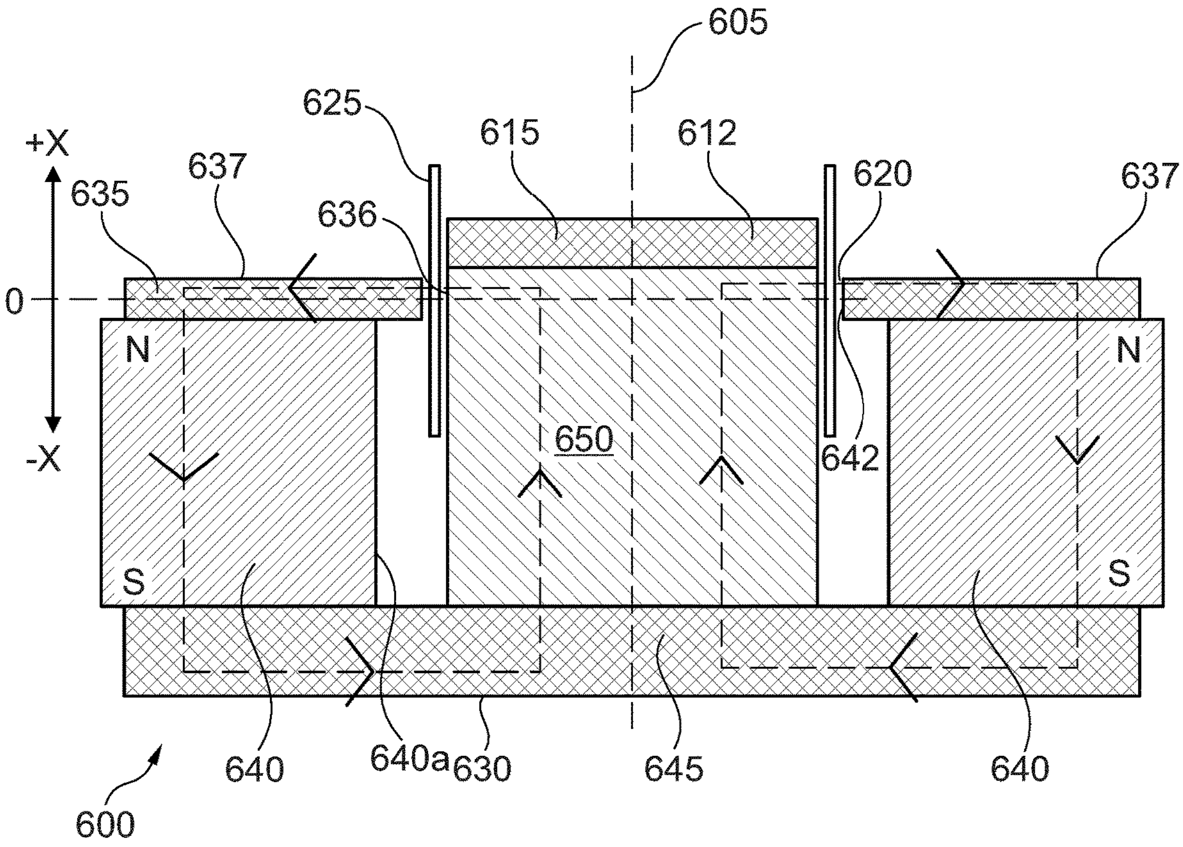
FIG. 6 is a schematic axial cross-sectional view of a motor for an electrodynamic loudspeaker in accordance with a $5^{th}$ embodiment of the invention.

FIG. 6 shows a schematic axial cross-sectional view of a motor 600 for an electrodynamic loudspeaker (not shown) in accordance with a 5$^{th}$ embodiment of the invention. The center pole piece of the motor 600 comprises a magnetic member 650 which extends axially all the way from a top of the air gap 620 to a magnetically permeable bottom plate or yoke 630. The center pole piece 645 of the present magnetic circuit lacks the previously discussed magnetically permeable pole tops 210, 310, 410, 510. Hence, in the present motor embodiment 600 it is an axially extending peripheral wall section 636 of the magnetic member 650 which forms an inner, e.g. circular or elliptical, axially extending peripheral wall section 636 of the center pole piece. The opposing wall of the air gap 620 is formed by an inner, e.g. circular or elliptical, axially extending wall section 642 of the magnetically permeable top plate 635 such that these two axially extending wall sections jointly define dimensions of the air gap 620. The magnetic member 650 is preferably formed by the previously discussed DC magnetically saturated isotropic, high resistive Soft Magnetic Composite (SMC) material. The outer annular magnet 640 drives the magnetic member 650 into DC magnetic saturation by generating an appropriate magnetic flux such that the relative AC magnetic permeability of the member 650 preferably is smaller than 5 or smaller than 2. The motor 600 comprises an outwardly projecting magnetically permeable member 615 which is supported by, and preferably bonded to, an upper surface of the magnetic member 650 and arranged above a top of the magnetic gap 620. In one variant of the present motor embodiment 600, the magnetic member 650 comprises an axially extending, i.e. along axis 605, through-going opening or aperture (not shown) which serves to reduce an effective cross-sectional area of the magnetic member 650 for example by more than 30% or 50%. This axially extending through-going opening or aperture of the magnetic member 650 may serve to facilitate DC magnetic saturation of the material of the magnetic member 650 such as the previously discussed SMC material.

Figure 7:
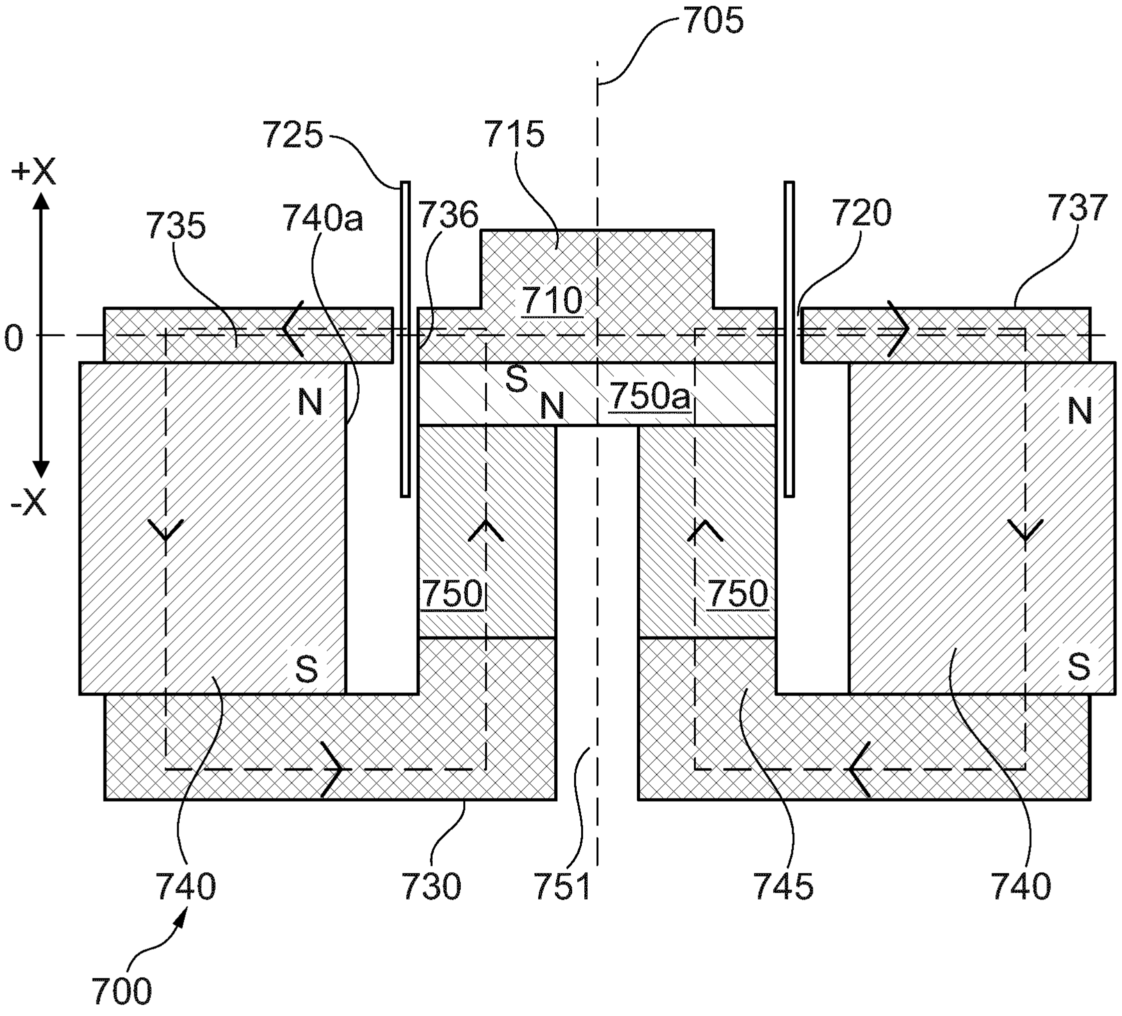
FIG. 7 is a schematic axial cross-sectional view of a motor for an electrodynamic loudspeaker in accordance with a $6^{th}$ embodiment of the invention.

FIG. 7 shows a schematic axial cross-sectional view of a motor 700 for an electrodynamic loudspeaker (not shown) in accordance with a 6$^{th}$ embodiment of the invention. The center pole piece 745 of the motor 700 comprises an annular cylindrical magnetic member 750 arranged about a central motor axis 705. The annular cylindrical magnetic member 750 is fabricated from a magnetically permeable material, preferably the isotropic high resistive Soft Magnetic Composite (SMC) material discussed above. The center pole piece additionally comprises a disc shaped permanent magnet 750*a*, for example a Neodymium magnet, which is from a bottom of the air gap 720 and extends down to a top surface of the annular cylindrical magnetic member 750. The disc shaped permanent magnet 750*a* is configured to drive the annular cylindrical magnetic member 750 into DC magnetic saturation. The DC magnetic saturation of the annular cylindrical magnetic member 750 provides a small relative AC magnetic permeability, such as smaller than 5, or smaller than 2, of the annular cylindrical magnetic member 750. The axially oriented through going aperture 751 of the annular cylindrical magnetic member 750 reduces the effective cross-sectional area of the magnetic member 750 and therefore helps to provokes appropriate DC magnetic saturation in the magnetic member 750.

The center pole piece of the present magnetic circuit additionally comprises a magnetically permeable pole top 710 which conducts and directs magnetic flux radially through the air gap 725. The magnetically permeable pole top 710 is preferably integrally formed with an outwardly projecting, and recessed, portion or protrusion 715 or "hat" arranged above, i.e. outwardly of, the top of the air gap 720 in a similar manner as the first embodiment of the invention discussed above.

Figure 8:
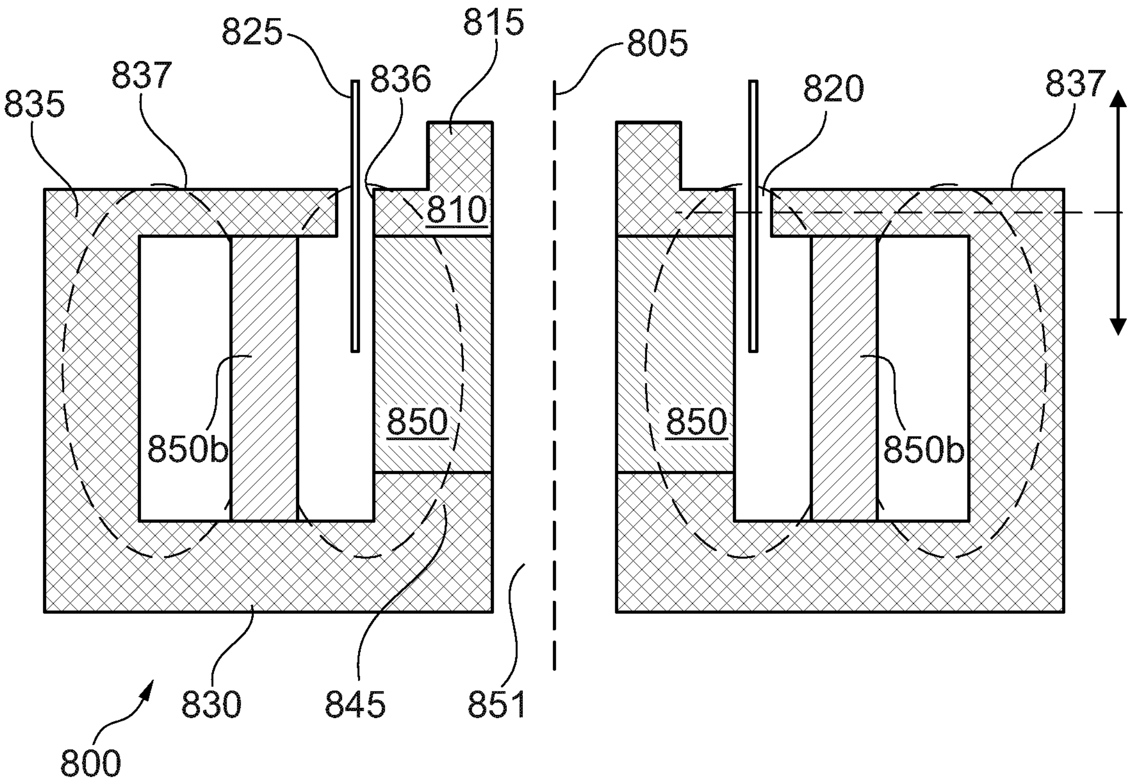
FIG. 8 is a schematic axial cross-sectional view of a motor for an electrodynamic loudspeaker in accordance with a $7^{th}$ embodiment of the invention.

FIG. 8 shows a schematic axial cross-sectional view of a motor 800 for an electrodynamic loudspeaker (not shown) in accordance with a 7$^{th}$ embodiment of the invention. The center pole piece of the motor 800 comprises an annular cylindrical magnetic member 850 arranged about a central motor axis 805. The annular cylindrical magnetic member 850 is fabricated in a magnetically permeable material, preferably the isotropic high resistive Soft Magnetic Composite (SMC) material discussed above. An upper top surface of the annular cylindrical magnetic member 850 is arranged at the bottom of air gap 820 and extends axially down to a bottom member 845 of the center pole piece. The bottom member 845 of the center pole piece may be integrally formed with a magnetically permeable bottom plate or yoke 830. The center pole piece has an axially oriented thoroughgoing aperture or hole 851 which extends through the bottom plate or yoke 830, the annular cylindrical magnetic member 850 and through a magnetically permeable pole top 810. The motor 800 additionally comprises an annular, or toroid, field coil 850*b*, which carries a suitable DC current, at least during operation of the motor 800, to generate a DC or static magnetic field through the magnetic circuit assembly. The magnetic field and flux generated by the annular field coil 850*b* is configured to drive the annular cylindrical magnetic member 850 into DC magnetic saturation. Hence, the annular field coil 850*b* serves essentially the same purpose as the disc shaped permanent magnet 750*a* of the previously discussed 6$^{th}$ embodiment of the present motor. The DC magnetic saturation of the annular cylindrical magnetic member 850 provides a small relative AC magnetic permeability, such as smaller than 5, or smaller than 2 of the annular cylindrical magnetic member 850. The axially oriented through going aperture 851 of the annular cylindrical magnetic member 850 reduces its effective cross-sectional area and therefore helps to provokes appropriate DC magnetic saturation in the magnetic member 850.

Figure 9:
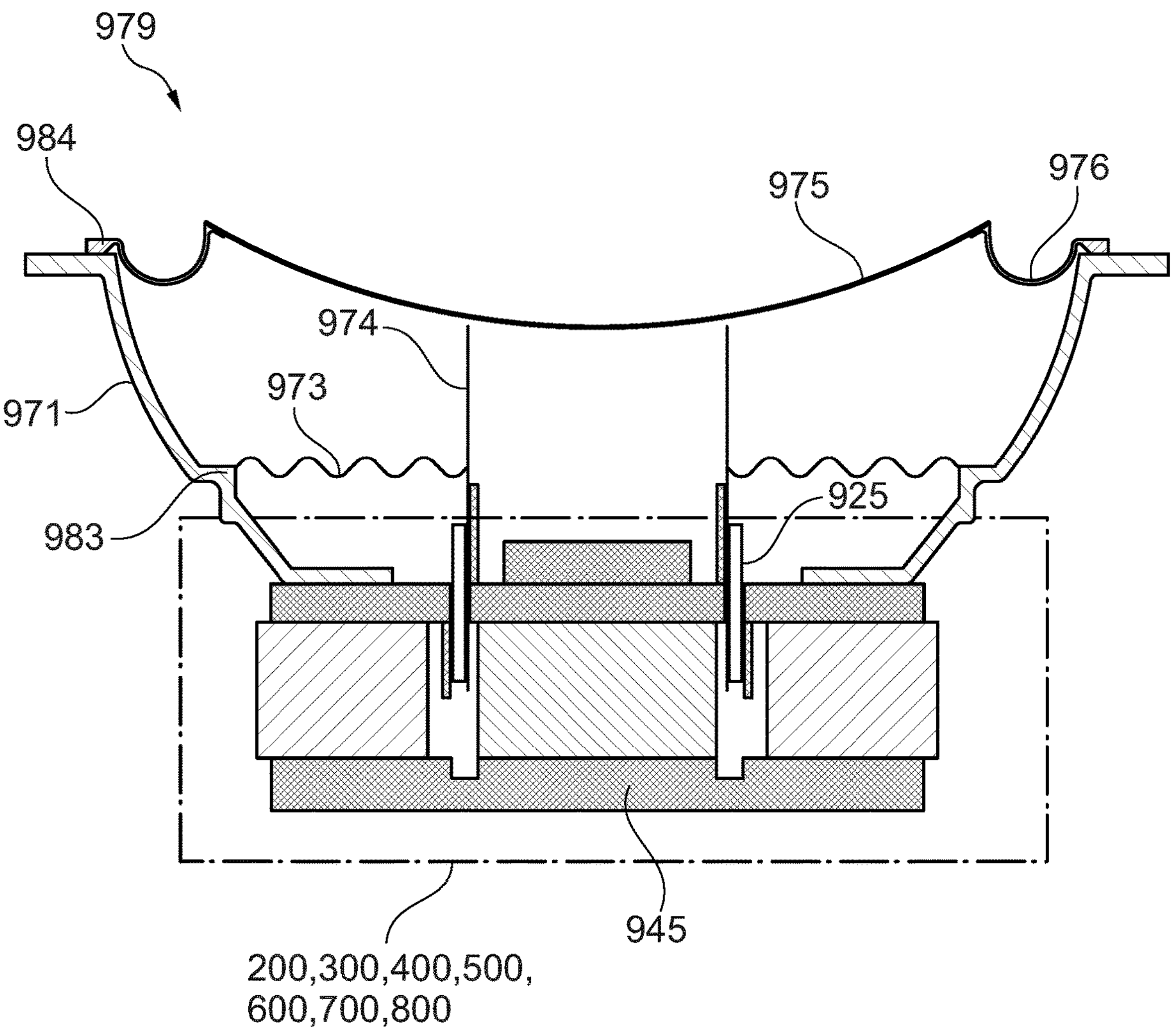
FIG. 9 shows a schematic axial cross-sectional view of an exemplary electrodynamic loudspeaker incorporating a motor according to any of the above-mentioned embodiments of the motor.

FIG. 9 shows a schematic axial cross-sectional view of an exemplary electrodynamic loudspeaker 979 incorporating a motor according to any of the above-mentioned embodiments of the motor 200, 300, 400, 500, 600, 700 and 800. The electrodynamic loudspeaker 979 or driver generally comprises a frame 971 mounted to the motor 900 and a diaphragm 975. The diaphragm 975 is attached or connected to the frame 971 through a flexible surround 976 which may comprise an outer rim 984 which is glued or otherwise fixedly attached to a peripheral upwards oriented circular surface of the frame 971. This provides for the diaphragm 975 to vibrate in accordance with vibrations of the voice coil 925. The voice coil 925 may be supported by a hollow, cylindrical-shaped former 974 which is also attached to a spider 973. The spider 973 is a flexible, corrugated support that holds the voice coil 925 centered in the air gap 920 of the motor 900 while allowing the voice coil 925 to move freely in upward and downward directions. The spider 973 may be connected to an outer surface of the former 974 and to a spider plateau 983 located on the interior part of the frame 971 by different means such as adhesives. The frame 971 has a generally circular shape in the embodiment described herein. However, in other embodiments, the frame 971, and other elements of the loudspeaker 979, may be of a different form, e.g. a rectangular or elliptical outline or form. The former 974 may be fixedly attached to an inner circular surface area of the diaphragm 975 by adhesives or other bonding mechanisms. The diaphragm 975 can be made of any suitable material with sufficient rigidity and weight such as fabric, plastic, paper or lightweight metal. The frame 971 can be made of any suitable material such as metal or non-metal materials.

Figure 10:
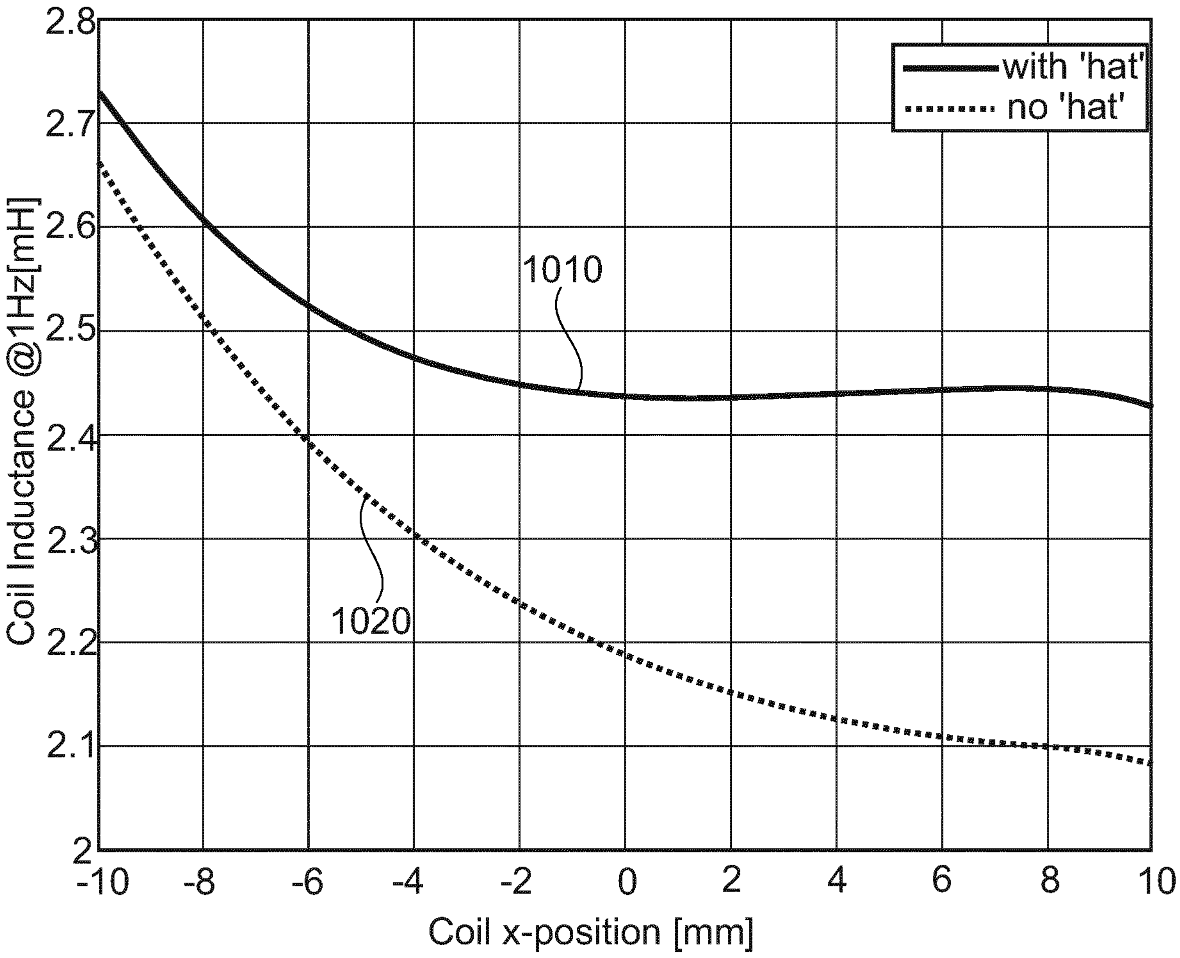
FIG. 10 shows plots of the voice coil inductance at 1 Hz versus inward and outward displacement of an exemplary motor design or structure according to the present invention as simulated by Finite Element Analysis.

FIG. 10 shows a plot of voice coil inductance at 1 Hz versus inwards and outwards displacement of as simulated by Finite Element Analysis modelling of the motor design 200 according to the first embodiment of the invention. The x-axis shows the voice displacement relative to its rest or neutral position in millimeters. The y-axis shows the inductance of the voice coil at 1 Hz in mH. The present motor construction included a voice coil 225 with a diameter of 39 mm, a height of 23.7 mm and 220 turns or windings. The height of the air gap 220 is 4 mm.

A first plot 1010 represents the simulated inductance of the motor design 200 which includes the magnetically permeable outwardly projecting protrusion or "hat" 215 arranged above, i.e. outwardly of, the top 220*a* of the air gap 220. A second plot 1020 represents the simulated inductance of the same motor design 200, but without the magnetically permeable "hat" 215.

As evident from first plot 1010 for a peak-peak displacement range of 10 mm of the voice coil about the rest position (x=0), the inductance variation of the voice coil 225 is merely about 0.06 mH/2.45 mH=2.5%. Furthermore, this level of performance is also achieved at somewhat higher frequencies such as 31 Hz. The 10 mm displacement range corresponds to about 0.5 times the difference between the height of the voice coil 225 and the height of the air gap 220 for the present motor design. As evident from second plot 1020 without the "hat" for the same peak-peak displacement range of 10 mm about the rest position (X=0), the inductance variation of the voice coil is much larger and about 0.25 mH/2.2 mH=11%.

Figure 11:
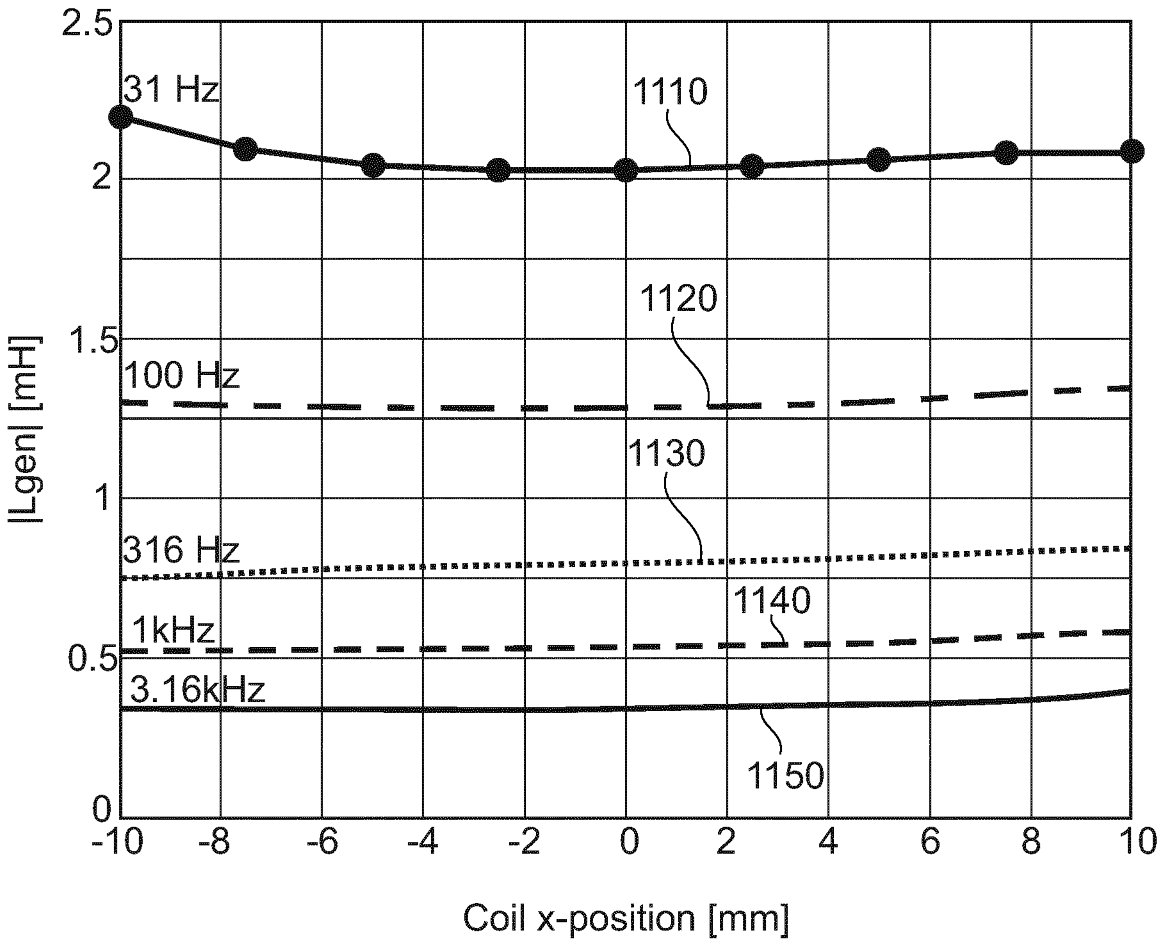
FIG. 11 shows plots of voice coil inductance at different frequencies versus inward and outward displacement of an exemplary motor design or structure according to the present invention as simulated by Finite Element Analysis.

FIG. 11 shows a series of five individual plots of the voice coil inductance at various frequencies versus inwards and outwards displacement of an exemplary motor design or structure as simulated by Finite Element Analysis modelling of the motor design 500 according to the 4$^{th}$ embodiment of the invention. This motor construction is overall similar to the above-mentioned motor construction in connection with FIG. 10, but additionally comprises the first and second electrically conductive shorting rings: The latter rings cause a beneficial reduction of voice coil inductance at higher frequencies, e.g. above 10 Hz or 31 Hz, for the reasons discussed above. The x-axis shows the voice displacement relative to its rest or neutral position in millimeters. The y-axis shows the inductance of the voice coil at 1 Hz in mH.

The series of plots of the voice coil inductance includes a first plot 1110 simulated at 31 Hz, a second plot 1120 simulated at 100 Hz, a third plot 1130 simulated at 316 Hz, a fourth plot 1140 simulated at 1 kHz and a fifth plot 1150 simulated at 3.16 kHz. As evident from each of these voice coil inductance plots, the variation of the inductance of the voice coil is very small for all test frequencies. For example, at 31 Hz the inductance variation is about 2-3% for a peak-peak displacement range of 10 mm of the voice coil 225 about the rest position (x=0). Furthermore, a substantially similar level of performance is also achieved at the higher frequencies such as at 316 Hz, 1 kHz and 3.16 kHz.

Figure 12:
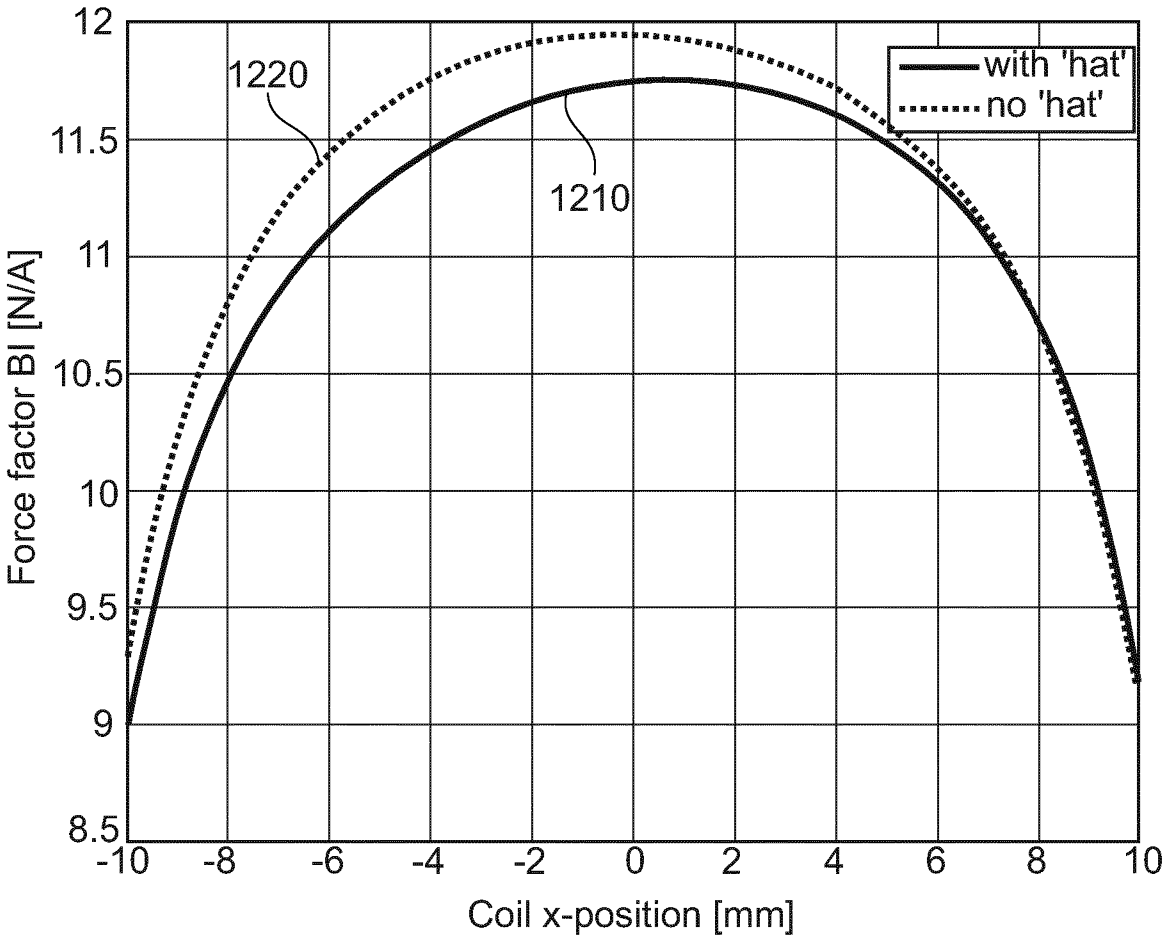
FIG. 12 shows plots of B*I products versus inward and outward displacement of an exemplary motor design or structure according to the present invention as simulated by Finite Element Analysis.

FIG. 12 shows plots of the B*I products versus inward and outward displacement as simulated by Finite Element Analysis modelling of the motor design 200 according to the first embodiment of the invention. The x-axis shows the voice displacement relative to its rest or neutral position in millimeters. The y-axis shows the force factor. A first plot 1210 represents the simulated B*I product of the motor design 200 which includes the magnetically permeable outwardly projecting protrusion or "hat" 215 arranged above, i.e. outwardly of, the top 220*a* of the air gap 220. A second plot 1220 represents the simulated B*I product of the same motor design 200, but without the magnetically permeable "hat" 215.

Figure 13:
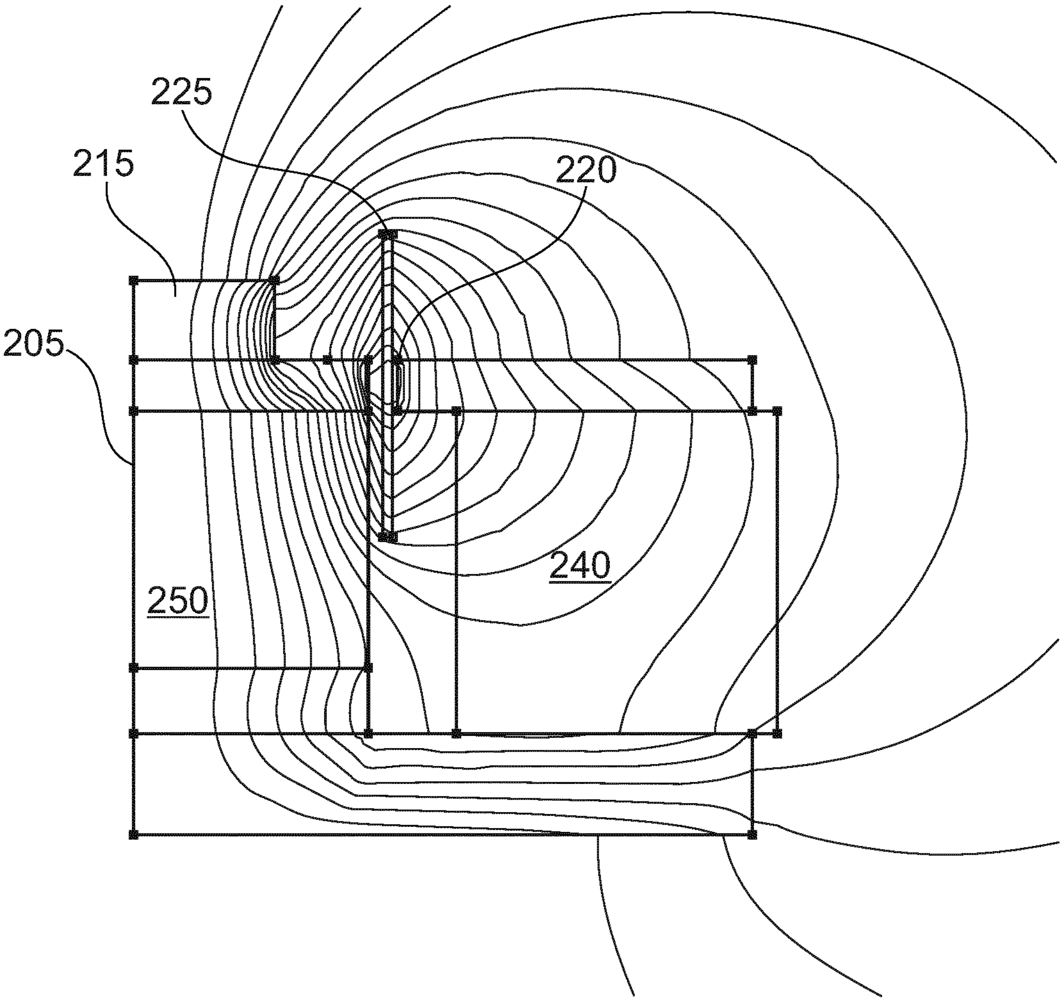
FIG. 13 shows a plot of magnetic field lines at the air gap of a magnetic circuit assembly of a motor design or construction according to an exemplary embodiment of the present invention as simulated by Finite Element Analysis.

FIG. 13 shows a plot of AC magnetic field lines at the air gap 220 of a magnetic circuit assembly of the motor design or construction 200 according to the first embodiment of the invention as simulated by Finite Element Analysis. The simulation is done at a very low frequency e.g. 1 μHz, to avoid influence of eddy currents. This plot illustrates that the AC field lines (i.e. those generated by the voice coil 225, not the permanent magnet 240) that cross the voice coil 220 do so twice, in opposite directions. The Lorentz force on the voice coil contributed by those magnetic field lines thus cancels out. A consequence of this mechanism is that the derivative of voice coil inductance L'(x) is very close to zero.

The invention claimed is:

1. A motor for an electrodynamic loudspeaker, comprising:

a magnetic circuit assembly arranged about a motor axis, comprising: an outer magnet, a magnetically permeable top plate, a magnetically permeable bottom plate, a center pole piece and an air gap for receipt of a voice coil; wherein the air gap is formed by an inner axially extending wall of the magnetically permeable top plate facing an axially extending peripheral wall section of the center pole piece to define a width, a bottom, a top and height of the air gap;

an outwardly projecting magnetically permeable member arranged above the top of the air gap;

said center pole piece comprising a magnetic member extending axially from at least the bottom of the air gap to a magnetically permeable bottom member or to the magnetically permeable bottom plate;

wherein said magnetic member exhibits a relative alternating current (AC) magnetic permeability smaller than 10, or smaller than 5 or smaller than 2, wherein a height of the magnetic member of the center pole piece is at least 0.5 times a height of the outer magnet or more than 0.7 times or 0.9 times the height of the outer magnet.

2. A motor for an electrodynamic loudspeaker according to claim 1, wherein the magnetic member of the center pole piece comprises a permanent magnet or a Neodymium magnet or a Ferrite magnet.

3. A motor for an electrodynamic loudspeaker according to claim 1, wherein the magnetic member of the center pole piece comprises a magnetically permeable material or an isotropic, high resistive Soft Magnetic Composite (SMC) material, driven into direct current (DC) magnetic saturation by at least one of: a permanent magnet or a field coil.

4. A motor for an electrodynamic loudspeaker according to claim 1, wherein the magnetic member of the center pole piece extends outwardly to the top of the air gap to define the axially extending peripheral wall section of the center pole piece.

5. A motor for an electrodynamic loudspeaker according claim 1, wherein the center pole piece comprises a magnetically permeable pole top; said magnetically permeable pole top extending axially from the bottom of the air gap to the top of the air gap to define the axially extending peripheral wall section of the center pole piece.

6. A motor for an electrodynamic loudspeaker according to claim 5, wherein the magnetically permeable pole top and the outwardly projecting magnetically permeable member are integrally formed by a single piece of magnetically permeable material or a ferromagnetic material.

7. A motor for an electrodynamic loudspeaker according to claim 6, wherein the magnetically permeable pole top comprises a disc or cylindrical element defining the axially extending peripheral wall section of the center pole piece and the outwardly projecting magnetically permeable member.

8. A motor for an electrodynamic loudspeaker according to claim 7, wherein the outwardly projecting magnetically permeable member defines a recessed outer wall relative to the axially extending peripheral wall section of the center pole piece.

9. A motor for an electrodynamic loudspeaker according to claim 1, wherein the outwardly projecting magnetically permeable member is arranged inside an outwardly projecting plane or surface defined by the axially extending peripheral wall section of the center pole piece.

10. A motor for an electrodynamic loudspeaker according to claim 9, further comprising a non-magnetic spacer disposed in-between a top of the center pole piece and the outwardly projecting magnetically permeable member.

11. A motor for an electrodynamic loudspeaker according claim 1, wherein the outwardly projecting magnetically permeable member is arranged outside an outwardly projecting plane defined by the inner axially extending wall of the magnetically permeable top plate.

12. A motor for an electrodynamic loudspeaker according to claim 1, further comprising at least one of:

an electrically conductive ring arranged below the bottom of the air gap and surrounding the center pole piece; or an electrically conductive ring, surrounding the outwardly projecting magnetically permeable member, arranged above the top of the air gap and inside the outwardly projecting plane or surface defined by the axially extending peripheral wall section of the center pole piece.

13. An electrodynamic loudspeaker comprising a motor, the motor including a magnetic circuit assembly arranged about a motor axis, the magnetic circuit assembly comprising:

an outer magnet, a magnetically permeable top plate, a magnetically permeable bottom plate, a center pole piece and an air gap for receipt of a voice coil;

wherein the air gap is formed by an inner axially extending wall of the magnetically permeable top plate facing an axially extending peripheral wall section of the center pole piece to define a width, a bottom, a top and height of the air gap;

an outwardly projecting magnetically permeable member arranged above the top of the air gap;

said center pole piece comprising a magnetic member extending axially from at least the bottom of the air gap to a magnetically permeable bottom member or to the magnetically permeable bottom plate;

wherein said magnetic member exhibits a relative alternating current (AC) magnetic permeability smaller than 10, or smaller than 5 or smaller than 2;

the loudspeaker further comprising:

a frame, a displaceable diaphragm attached to the voice coil, said voice coil being arranged in the air gap of the motor, wherein the magnetic circuit assembly is configured such that a variation of inductance of the voice coil over a predetermined displacement range of the voice coil defined by an outwards displacement limit and an inwards displacement limit is less than 10% or less than 7.5% or less than 5%, measured at 31 Hz; wherein said displacement range corresponds to 0.5 times a difference of the height of the voice coil and the height of the air gap.

14. A motor for an electrodynamic loudspeaker, comprising:

a magnetic circuit assembly arranged about a motor axis, comprising: an outer magnet, a magnetically permeable top plate, a magnetically permeable bottom plate, a center pole piece and an air gap for receipt of a voice coil; wherein the air gap is formed by an inner axially extending wall of the magnetically permeable top plate facing an axially extending peripheral wall section of the center pole piece to define a width, a bottom, a top and height of the air gap;

an outwardly projecting magnetically permeable member arranged above the top of the air gap;

said center pole piece comprising a magnetic member extending axially from at least the bottom of the air gap to a magnetically permeable bottom member or to the magnetically permeable bottom plate;

wherein said magnetic member exhibits a relative alternating current (AC) magnetic permeability smaller than 10, or smaller than 5 or smaller than 2, wherein the center pole piece includes a magnetically permeable pole top, the magnetically permeable pole top and the outwardly projecting magnetically permeable member being integrally formed by a single piece of magnetically permeable material.

15. A motor for an electrodynamic loudspeaker according to claim 14, wherein the magnetically permeable pole top extends axially from the bottom of the air gap to the top of the air gap to define the axially extending peripheral wall section of the center pole piece.

* * * * *